(12) United States Patent
Adams, Jr. et al.

(10) Patent No.: US 8,594,451 B2
(45) Date of Patent: Nov. 26, 2013

(54) EDGE MAPPING INCORPORATING PANCHROMATIC PIXELS

(75) Inventors: James E. Adams, Jr., Rochester, NY (US); John F. Hamilton, Jr., Rochester, NY (US); Michele O'Brien, Rochester, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1227 days.

(21) Appl. No.: 11/694,074

(22) Filed: Mar. 30, 2007

(65) Prior Publication Data

US 2008/0240602 A1 Oct. 2, 2008

(51) Int. Cl.
*G06K 9/48* (2006.01)
*G06K 9/40* (2006.01)

(52) U.S. Cl.
USPC .......................................................... 382/266

(58) Field of Classification Search
USPC ................. 382/162, 164, 165, 167, 254, 255, 382/260–264, 266, 275, 294, 299; 358/1.9, 358/512–518, 525, 530; 375/240.27, 375/240.29; 348/222.1, 230.1, 272, 348/275–277, 627
See application file for complete search history.

(56) References Cited

U.S. PATENT DOCUMENTS

| | | | |
|---|---|---|---|
| 3,971,065 A | 7/1976 | Bayer | |
| 4,618,990 A * | 10/1986 | Sieb et al. | 382/266 |
| 4,962,426 A | 10/1990 | Naoi et al. | |
| 5,038,388 A | 8/1991 | Song | |
| 5,237,402 A | 8/1993 | Deshon et al. | |
| 5,420,971 A | 5/1995 | Westerink et al. | |
| 5,506,619 A | 4/1996 | Adams, Jr. et al. | |
| 5,629,734 A | 5/1997 | Hamilton, Jr. et al. | |
| 5,708,729 A | 1/1998 | Adams et al. | |
| 5,949,914 A | 9/1999 | Yuen | |
| 6,011,875 A | 1/2000 | Laben et al. | |
| 6,075,889 A | 6/2000 | Hamilton, Jr. et al. | |
| 6,097,835 A | 8/2000 | Lindgren | |
| 6,173,085 B1 | 1/2001 | Hamilton, Jr. et al. | |
| 6,356,672 B1 | 3/2002 | Feng et al. | |
| 6,476,865 B1 | 11/2002 | Gindele et al. | |
| 6,493,029 B1 | 12/2002 | Denyer et al. | |

(Continued)

FOREIGN PATENT DOCUMENTS

| | | |
|---|---|---|
| EP | 1 241 896 A2 | 9/2002 |
| EP | 1 594 321 A2 | 11/2005 |

(Continued)

OTHER PUBLICATIONS

Aanes et al, Spectrally Consistent Satellite Image Fusion with Improved Image Priors, Signal Processing Symposim NORSIG 2006, Proceedings of the 7th Nordic, IEEE, PI, Jun. 1, 2006 pp. 14-17.

(Continued)

*Primary Examiner* — Amir Alavi
(74) *Attorney, Agent, or Firm* — Blakely Sokoloff Taylor & Zafman LLP

(57) ABSTRACT

A method of enhancing a full-color image of a scene includes capturing an image of the scene using a two-dimensional sensor array having both color and panchromatic pixels, forming an edge map in response to the panchromatic pixels, forming the full-color image in response to the captured color pixels, and using the edge map to enhance the full-color image.

8 Claims, 11 Drawing Sheets

(56) References Cited

U.S. PATENT DOCUMENTS

| | | | |
|---|---|---|---|
| 6,529,239 | B1 | 3/2003 | Dyck et al. |
| 6,614,474 | B1 | 9/2003 | Malkin et al. |
| 6,646,246 | B1 | 11/2003 | Gindele et al. |
| 6,654,492 | B1 | 11/2003 | Sasai |
| 6,757,012 | B1 | 6/2004 | Hubina et al. |
| 6,801,672 | B1 * | 10/2004 | Thomas ............ 382/275 |
| 6,813,046 | B1 | 11/2004 | Gindele et al. |
| 6,882,364 | B1 | 4/2005 | Inuiya et al. |
| 6,937,774 | B1 | 8/2005 | Specht et al. |
| 7,099,518 | B2 * | 8/2006 | Li et al. ............ 382/255 |
| 7,151,858 | B2 * | 12/2006 | Kyong ............ 382/266 |
| 7,298,922 | B1 * | 11/2007 | Lindgren et al. ........ 382/294 |
| 7,301,573 | B2 * | 11/2007 | Park et al. ............ 348/252 |
| 7,340,099 | B2 | 3/2008 | Zhang |
| 7,379,590 | B2 | 5/2008 | Zhang |
| 7,577,311 | B2 * | 8/2009 | Palum et al. ............ 382/275 |
| 7,688,368 | B2 * | 3/2010 | Kijima et al. ............ 348/272 |
| 7,769,241 | B2 | 8/2010 | Adams, Jr. et al. |
| 7,830,430 | B2 | 11/2010 | Adams, Jr. et al. |
| 7,844,127 | B2 | 11/2010 | Adams, Jr. et al. |
| 2002/0186309 | A1 | 12/2002 | Keshet et al. |
| 2003/0053684 | A1 | 3/2003 | Acharya |
| 2003/0081854 | A1 * | 5/2003 | Deshpande ............ 382/261 |
| 2003/0210332 | A1 | 11/2003 | Frame |
| 2003/0222998 | A1 | 12/2003 | Yamauchi et al. |
| 2004/0264796 | A1 * | 12/2004 | Turner et al. ............ 382/254 |
| 2005/0047674 | A1 | 3/2005 | Walmsley et al. |
| 2005/0094887 | A1 | 5/2005 | Cakir et al. |
| 2005/0231618 | A1 | 10/2005 | Sugiyama |
| 2006/0152596 | A1 | 7/2006 | Adams, Jr. et al. |
| 2007/0024879 | A1 * | 2/2007 | Hamilton et al. ............ 358/1.9 |
| 2007/0024931 | A1 * | 2/2007 | Compton et al. ............ 358/512 |
| 2007/0024934 | A1 * | 2/2007 | Andams et al. ............ 358/525 |
| 2007/0268533 | A1 * | 11/2007 | Kijima et al. ............ 358/512 |
| 2008/0030611 | A1 | 2/2008 | Jenkins |
| 2008/0112612 | A1 * | 5/2008 | Adams et al. ............ 382/167 |
| 2008/0123997 | A1 * | 5/2008 | Adams et al. ............ 382/299 |
| 2008/0130073 | A1 * | 6/2008 | Compton et al. ............ 358/512 |
| 2008/0130991 | A1 * | 6/2008 | O'Brien et al. ............ 382/167 |
| 2008/0131028 | A1 * | 6/2008 | Pillman et al. ............ 382/299 |
| 2008/0166062 | A1 * | 7/2008 | Adams et al. ............ 382/255 |
| 2008/0240601 | A1 * | 10/2008 | Adams et al. ............ 382/266 |
| 2008/0240602 | A1 * | 10/2008 | Adams et al. ............ 382/266 |
| 2008/0292182 | A1 * | 11/2008 | Morales et al. ............ 382/162 |
| 2009/0051984 | A1 * | 2/2009 | O'Brien et al. ............ 358/514 |
| 2009/0268055 | A1 * | 10/2009 | Hamilton et al. ............ 348/230.1 |

FOREIGN PATENT DOCUMENTS

| | | |
|---|---|---|
| WO | WO 97/35438 A1 | 9/1997 |
| WO | WO 2007/089426 A1 | 8/2007 |
| WO | 97/35438 | 9/2007 |

OTHER PUBLICATIONS

Kalevo et al, Noise Reduction Techniques for Bayer-Matrix Images Proceedings of the SPIE, vol. 4669, Jan. 21, 2002, pp. 348-359.

PCT/US2008/003885; International Search Report and Written Opinion of the International Searching Authority, mail date Apr. 3, 2009, 10 pages.

Chen, J. et al., "Color rectification of the saturated traffic sign image", 1994-2011 China Academic Journal Electronic Publishing House, vol. 32, No. 3, Jun. 2003, pp. 313-316.

Zhang, H. et al., "Wavelet image threshold denoising based on edge detection", 1994-2011 China Academic Journal Electronic Publishing House, vol. 26, No. 1, Jan. 2006, pp. 143-145.

Aanaes, H. et al., "Spectrally Consistent Satellite Image Fusion with Improved Image Priors," Signal Processing Symposium, NORSIG 2006, Proceedings of the 7$^{th}$ Nordic, IEEE, PI, Jun. 2006, pp. 14-17.

CN 200880011100.7—Chinese Office Action with English translation issued Mar. 22, 2011, 11 pages.

CN 200880011100.7—Chinese Office Action with English translation issued Mar. 29, 2012, 12 pages.

EP 08 727 142.5—EPO Communication pursuant to Article 94(3) EPC, dated Feb. 1, 2010, 2 pages.

PCT/US2008/003885; International Preliminary Report on Patentability, issued Oct. 6, 2009, 6 pages.

JP 2010-500958—Japanese Office Action with English translation issued Jun. 6, 2012, 5 pages.

* cited by examiner

| $P_{11}$ | $G_{22}$ | $P_{33}$ | $R_{44}$ | $P_{55}$ | $G_{66}$ | $P_{77}$ | $R_{88}$ | $P_{99}$ | $G_{110}$ | $P_{121}$ |
|---|---|---|---|---|---|---|---|---|---|---|
| $B_{10}$ | $P_{21}$ | $G_{32}$ | $P_{43}$ | $B_{54}$ | $P_{65}$ | $G_{76}$ | $P_{87}$ | $B_{98}$ | $P_{109}$ | $G_{120}$ |
| $P_9$ | $B_{20}$ | $P_{31}$ | $G_{42}$ | $P_{53}$ | $B_{64}$ | $P_{75}$ | $G_{86}$ | $P_{97}$ | $B_{108}$ | $P_{119}$ |
| $G_8$ | $P_{19}$ | $R_{30}$ | $P_{41}$ | $G_{52}$ | $P_{63}$ | $R_{74}$ | $P_{85}$ | $G_{96}$ | $P_{107}$ | $R_{118}$ |
| $P_7$ | $G_{18}$ | $P_{29}$ | $R_{40}$ | $P_{51}$ | $G_{62}$ | $P_{73}$ | $R_{84}$ | $P_{95}$ | $G_{106}$ | $P_{117}$ |
| $B_6$ | $P_{17}$ | $G_{28}$ | $P_{39}$ | $B_{50}$ | $P_{61}$ | $G_{72}$ | $P_{83}$ | $B_{94}$ | $P_{105}$ | $G_{116}$ |
| $P_5$ | $B_{16}$ | $P_{27}$ | $G_{38}$ | $P_{49}$ | $B_{60}$ | $P_{71}$ | $G_{82}$ | $P_{93}$ | $B_{104}$ | $P_{115}$ |
| $G_4$ | $P_{15}$ | $R_{26}$ | $P_{37}$ | $G_{48}$ | $P_{59}$ | $R_{70}$ | $P_{81}$ | $G_{92}$ | $P_{103}$ | $R_{114}$ |
| $P_3$ | $G_{14}$ | $P_{25}$ | $R_{36}$ | $P_{47}$ | $G_{58}$ | $P_{69}$ | $R_{80}$ | $P_{91}$ | $G_{102}$ | $P_{113}$ |
| $B_2$ | $P_{13}$ | $G_{24}$ | $P_{35}$ | $B_{46}$ | $P_{57}$ | $G_{68}$ | $P_{79}$ | $B_{90}$ | $P_{101}$ | $G_{112}$ |
| $P_1$ | $B_{12}$ | $P_{23}$ | $G_{34}$ | $P_{45}$ | $B_{56}$ | $P_{67}$ | $G_{78}$ | $P_{89}$ | $B_{100}$ | $P_{111}$ |

EDGE MAPPING INCORPORATING PANCHROMATIC PIXELS

CROSS REFERENCE TO RELATED APPLICATION

The present application is related to U.S. patent application Ser. No. 11/694,034 filed Mar. 30, 2007 (U.S. Patent Application Publication No. 2008/0240601), of James E. Adams, Jr., et al., entitled "Edge Mapping Using Panchromatic Pixels"; and U.S. patent application Ser. No. 11/564,451, filed Nov. 29, 2007 (U.S. Patent Application Publication No. 2008/0123997) by James E. Adams, Jr. et al., entitled "Providing A Desired Resolution Color Image".

FIELD OF THE INVENTION

The present invention relates to using an edge map to form an enhanced color image from a panchromatic image and a color image.

BACKGROUND OF THE INVENTION

Video cameras and digital still cameras generally employ a single image sensor with a color filter array to record a scene. This approach begins with a sparsely populated single-channel image in which the color information is encoded by the color filter array pattern. Subsequent interpolation of the neighboring pixel values permits the reconstruction of a complete three-channel, full-color image. This full-color image, in turn, can be noise-cleaned, sharpened, or color corrected to improve, or enhance, the appearance of the image. This image enhancement can be greatly facilitated by computing an edge map of the image in order to classify the image into edge regions and flat regions. This permits the use of algorithms that perform different computations for edge regions and for flat regions. One popular approach is to either directly detect or synthesize a luminance color channel, e.g. "green", and then to generate an edge map from the luminance image. U.S. Pat. No. 6,614,474 (Malkin et al.) describes computing a luminance channel and then generating edge information from a set of directional edge detection kernels. The problem with this approach is that edges that vary only in chrominance and not luminance run the risk of being undetected. To address this concern, U.S. Pat. No. 5,420,971 (Westerink et al.) teaches computing a YUV luminance-chrominance image, computing edge information from all three channels (Y, U, and V), and then combining them as an $L^2$-norm to detect both luminance and chrominance edges. The problem with this approach is the noisiness of the computed luminance-chrominance image is defined by the noisiness of the original color data, e.g., RGB. This level of noise in the original color data is determined, among other things, by the relative narrowness of the spectral frequency response of the individual color channels. When the scene being captured is well lit, e.g., a sunny landscape, the narrowness of the spectral frequency responses is usually not an issue. When the scene is not well lit, e.g., indoors, or the exposure time is necessarily short to reduce motion blur, e.g., at a sporting event, the relative narrowness of the spectral frequency response of the individual color channels can produce noisy images.

Under low-light imaging situations, it is advantageous to have one or more of the pixels in the color filter array unfiltered, i.e. white or panchromatic in spectral sensitivity. These panchromatic pixels have the highest light sensitivity capability of the capture system. Employing panchromatic pixels represents a tradeoff in the capture system between light sensitivity and color spatial resolution. To this end, many four-color color filter array systems have been described. U.S. Pat. No. 6,529,239 (Dyck et al.) teaches a green-cyan-yellow-white pattern that is arranged as a 2×2 block that is tessellated over the surface of the sensor. U.S. Pat. No. 6,757,012 (Hubina et al.) discloses both a red-green-blue-white pattern and a yellow-cyan-magenta-white pattern. In both cases, the colors are arranged in a 2×2 block that is tessellated over the surface of the imager. The difficulty with such systems is that only one-quarter of the pixels in the color filter array have highest light sensitivity, thus limiting the overall low-light performance of the capture device.

To address the need of having more pixels with highest light sensitivity in the color filter array, U.S. Patent Application Publication No. 2003/0210332 (Frame) describes a pixel array with most of the pixels being unfiltered. Relatively few pixels are devoted to capturing color information from the scene producing a system with low color spatial resolution capability. Additionally, Frame teaches using simple linear interpolation techniques that are not responsive to or protective of high frequency color spatial details in the image.

SUMMARY OF THE INVENTION

It is an object of the present invention to produce an enhanced digital color image from a digital image having panchromatic and color pixels.

This object is achieved by a method of providing an enhanced full-color image of a scene comprising:

(a) using a captured image of the scene that was captured by a two-dimensional sensor array having both color and panchromatic pixels;

(b) forming an edge map in response to the panchromatic pixels;

(c) forming the full-color image in response to the captured color pixels; and (d) using the edge map to enhance the full-color image.

It is a feature of the present invention that images can be captured under low-light conditions with a sensor having panchromatic and color pixels and processing produces an enhanced digital color image produced from the panchromatic and colored pixels.

The present invention makes use of a color filter array with an appropriate composition of panchromatic and color pixels in order to permit the above method to provide both improved low-light sensitivity and improved color spatial resolution fidelity. The above method preserves and enhances panchromatic and color spatial details and produces an enhanced full-color image.

BRIEF DESCRIPTION OF THE DRAWINGS

FIG. 4 is a pixel neighborhood used during the execution of low-frequency filtering in block 242 in FIG. 3;

FIG. 6 is a pixel neighborhood used during the execution of nonmaximum suppression in block 256 in FIG. 5;

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably used on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
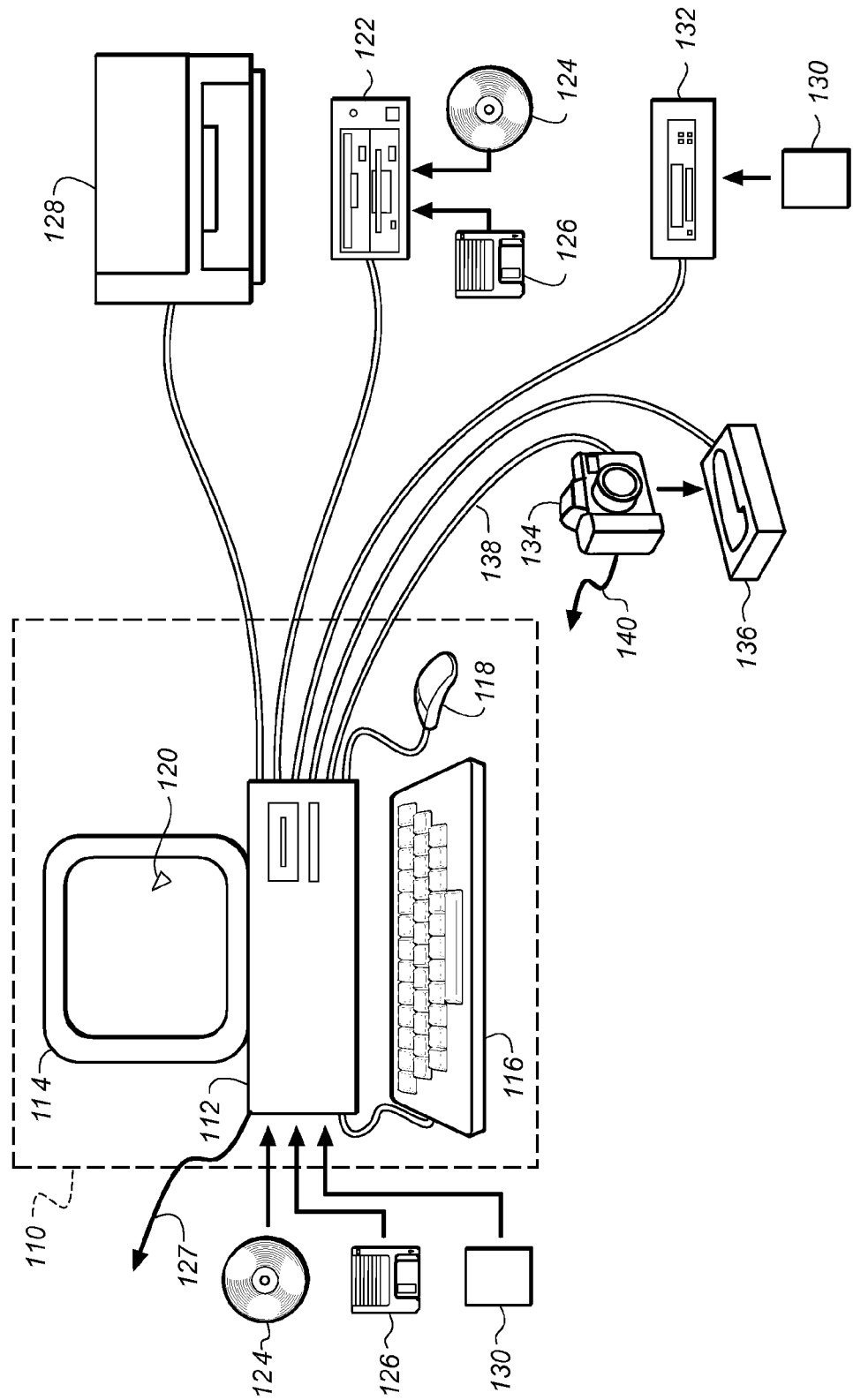
FIG. 1 is a perspective of a computer system including a digital camera for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a way of inputting the software programs and other information to the microprocessor based unit 112. In addition, a floppy disk 126 can also include a software program, and is inserted into the microprocessor-based unit 112 for inputting the software program. The compact disk-read only memory (CD-ROM) 124 or the floppy disk 126 can alternatively be inserted into externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130, such as, as it was formerly known, a PCMCIA card (based on the specifications of the Personal Computer Memory Card International Association) which contains digitized images electronically embodied in the PC card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images can also be input via the compact disk 124, the floppy disk 126, or the network connection 127. Any images stored in the PC card 130, the floppy disk 126 or the compact disk 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to images in order to sharpen the images.

Figure 2:
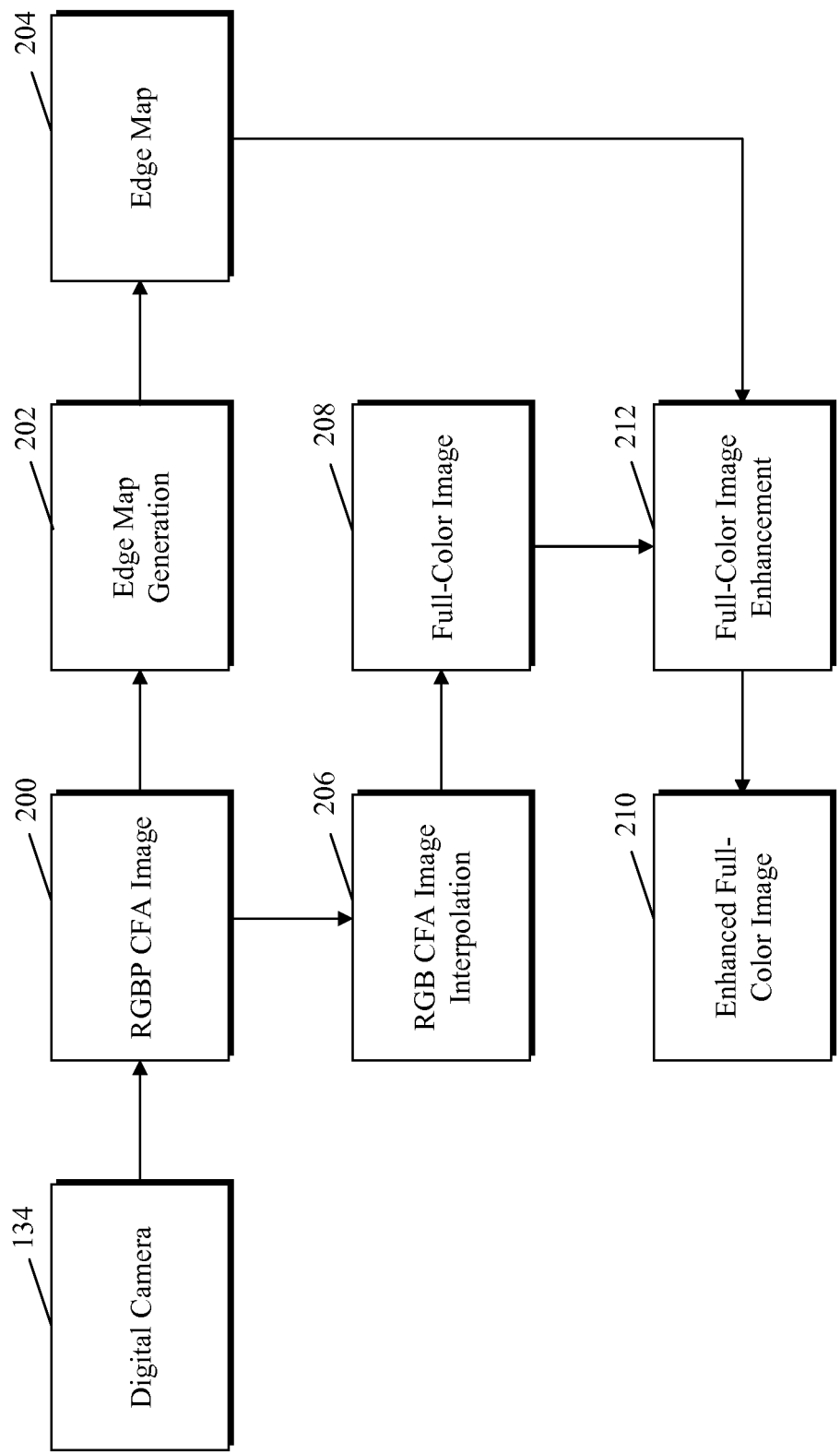
FIG. 2 is a block diagram of a preferred embodiment of the present invention.

FIG. 2 is a high-level diagram of the preferred embodiment of the present invention. The digital camera 134 (FIG. 1) is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. An edge map generation block 202 produces an edge map 204 from the RGBP CFA image 200. An RGB CFA image interpolation block 206 produces a full-color image 208 from the RGBP CFA image 200. A full-color image enhancement block 212 produces an enhanced full-color image 210 from the full-color image 208 and the edge map 204.

In FIG. 2, the RGB CFA image interpolation block 206 can be performed in any appropriate way known to those skilled in the art. Examples can be found in U.S. Patent Application No. 2007/0024934 (Adams et al.) Included in this reference are examples of using just captured color pixels to produce the full-color image and using captured color pixels and captured panchromatic pixels to produce the full-color image.

Figure 3:
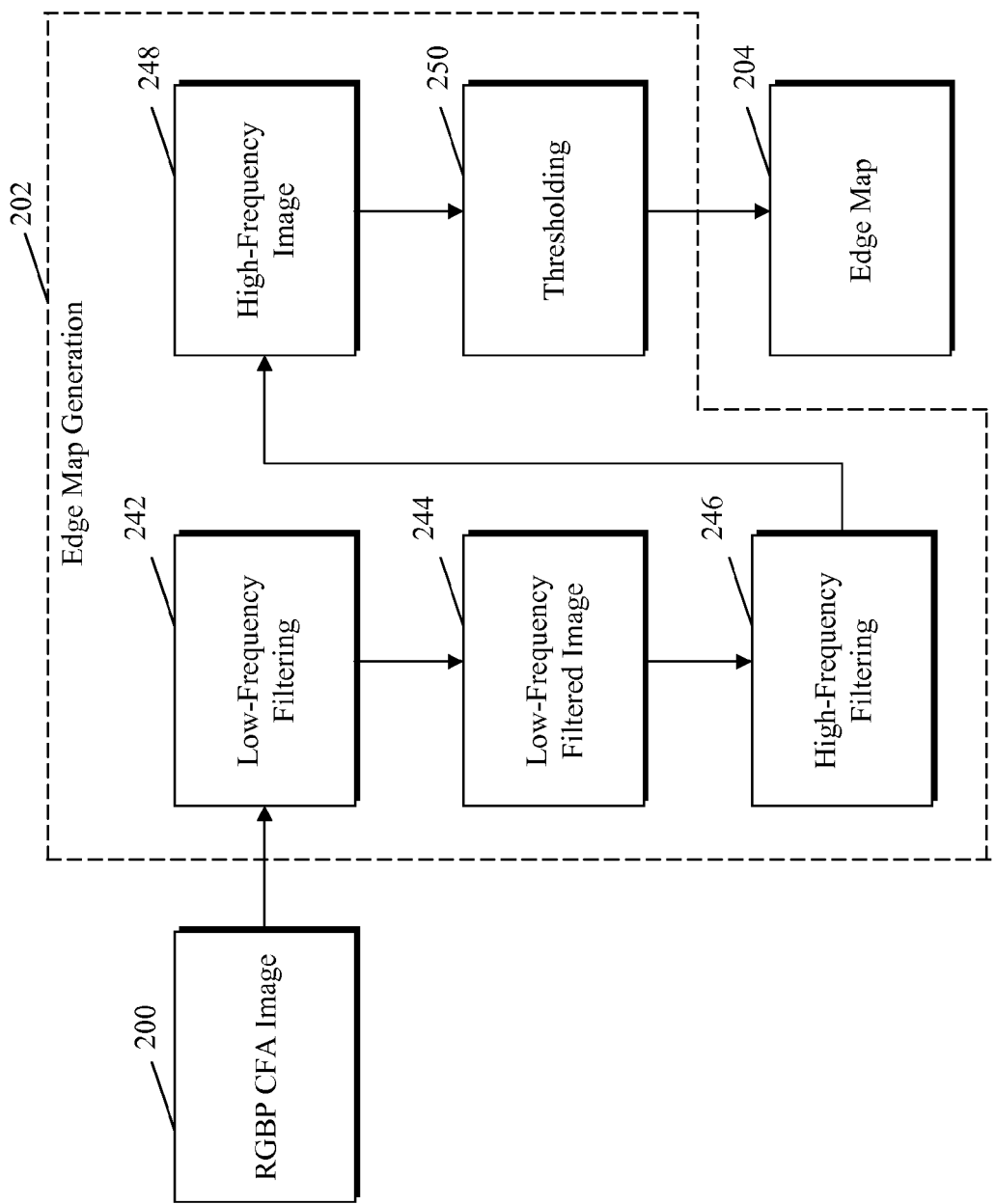
FIG. 3 is a block diagram showing block 202 in FIG. 2 in more detail.

FIG. 3 is a detailed block diagram of the edge map generation block 202 (FIG. 2) for the preferred embodiment. A low-frequency filtering block 242 produces a low-frequency filtered image 244 from the RGBP CFA image 200 (FIG. 2). A high-frequency filtering block 246 produces a high-frequency image 248 from the low-frequency filtered image 244. Finally, a thresholding block 250 produces the edge map 204 (FIG. 2) from the high-frequency image 248.

In FIG. 3, the low-frequency filtering of block 242 is achieved by convolving a low-frequency convolution kernel with the RGBP CFA image 200 (FIG. 2) in order to produce a pixel value for each color channel at every pixel location. As an example, consider a portion of a typical RGBP CFA image illustrated in FIG. 4. The following low-frequency convolution kernel can be used to produce a full-resolution panchromatic channel:

$$\begin{pmatrix} 1 & 2 & 1 \\ 2 & 4 & 2 \\ 1 & 2 & 1 \end{pmatrix}$$

It is well known by those skilled in the art how to create other appropriate low-frequency convolution kernels. When performing this convolution, it is assumed that only existing panchromatic pixel values are used. Explicitly, for computing the panchromatic pixel value for pixel $B_{50}$ (FIG. 4), the computation is a weighted average:

$$P_{50} = \frac{2P_{39} + 2P_{49} + 2P_{51} + 2P_{61}}{2+2+2+2}$$

In the case of an existing panchromatic pixel value, e.g., $P_{49}$, a low-frequency filtered version is computed:

$$P_{49} = \frac{P_{37} + P_{39} + 4P_{49} + P_{59} + P_{61}}{1+1+4+1+1}$$

Since the colored pixels in FIG. 4 are more sparsely populated than the panchromatic pixels, a larger low-frequency convolution kernel is used for producing full-resolution color channels:

$$\begin{pmatrix} 1 & 8 & 28 & 56 & 70 & 56 & 28 & 8 & 1 \\ 8 & 64 & 224 & 448 & 560 & 448 & 224 & 64 & 8 \\ 28 & 224 & 784 & 1568 & 1960 & 1568 & 784 & 224 & 28 \\ 56 & 448 & 1568 & 3136 & 3920 & 3136 & 1568 & 448 & 56 \\ 70 & 560 & 1960 & 3920 & 4900 & 3920 & 1960 & 560 & 70 \\ 56 & 448 & 1568 & 3136 & 3920 & 3136 & 1568 & 448 & 56 \\ 28 & 224 & 784 & 1568 & 1960 & 1568 & 784 & 224 & 28 \\ 8 & 64 & 224 & 448 & 560 & 448 & 224 & 64 & 8 \\ 1 & 8 & 28 & 56 & 70 & 56 & 28 & 8 & 1 \end{pmatrix}$$

It is well known by those skilled in the art how to create other appropriate low-frequency convolution kernels. When performing this convolution, it is assumed that only existing color pixel values are used. Explicitly, for computing the red pixel value for pixel $B_{50}$ (FIG. 4), the computation is:

$$R_{50} = \frac{\begin{array}{c}784R_{26} + 784R_{30} + 448R_{36} + 3136R_{40} + \\ 784R_{70} + 784R_{74} + 64R_{80} + 448R_{84}\end{array}}{784+784+448+3136+784+784+64+448}$$

When computing the low-frequency filtered version of $B_{50}$, the computation is:

$$B_{50} = \frac{\begin{array}{c}B_2 + 70B_6 + B_{10} + 448B_{16} + 64B_{20} + 70B_{46} + 4900B_{50} + \\ 70B_{54} + 3136B_{60} + 448B_{64} + B_{90} + 70B_{94} + B_{98}\end{array}}{\begin{array}{c}1+70+1+448+64+70+ \\ 4900+70+3136+448+70+1\end{array}}$$

The remaining low-frequency filtered color pixel values for each pixel in the RGBP CFA image 200 (FIG. 2) are computed in a similar manner.

Returning to FIG. 3, the high-frequency filtering block 248 is generally performed by one of two methods: direct convolution or as a part of unsharp masking. With direct convolution, the panchromatic channel of the low-frequency filtered image 244 is convolved with a high-frequency kernel and the absolute value of the result is the high-frequency image 248. An example of an appropriate high-frequency kernel is $$\begin{pmatrix} -1 & -1 & -1 \\ -1 & 8 & -1 \\ -1 & -1 & -1 \end{pmatrix}.$$

It is well known by those skilled in the art how to create other appropriate high-frequency kernels. In the case of unsharp masking, the panchromatic channel of the low-frequency filtered image 244 is convolved with a low-frequency kernel and the resulting low-frequency image is subtracted from the panchromatic channel of the low-frequency filtered image 244. The absolute value of this subtraction is the high-frequency image 248. An example of an appropriate low-frequency kernel would be $$\begin{pmatrix} 1 & 2 & 1 \\ 2 & 4 & 2 \\ 1 & 2 & 1 \end{pmatrix}.$$

It is well known by those skilled in the art how to create other appropriate low-frequency kernels. The examples just given can be augmented by operating not just on the panchromatic channel, but also on all of the color channels and then adding the results together:

$$H_{ALL} = H_P + H_R + H_G + H_B$$

In this case, the high-frequency image 248 includes the sum of the high-frequency images ($H_{ALL}$) for the panchromatic ($H_P$), red ($H_R$), green ($H_G$), and blue ($H_B$) channels, respectively, produced by the high-frequency filtering block 246.

In FIG. 3, a thresholding block 250 produced the edge map 204 (FIG. 2) from the high-frequency image 248. Thresholding in block 250 is generally performed by testing each pixel value in the high-frequency image 248 against a given threshold value. If the pixel value in the high-frequency image 248 is equal to or greater than the given threshold value, the corresponding pixel value in the edge map is marked as an edge pixel and set to a value that indicates the presence of an edge, e.g., one. If the pixel value in the high-frequency image 248 is less than the given threshold value, the corresponding pixel value in the edge map is marked as a flat pixel and set to a value that indicates the absence of an edge, e.g., zero. Multiple thresholds can also be used. As an example, after producing a first edge map using a relatively large first threshold value, a second edge map is produced from the first edge map and the high-frequency image 248 using a smaller second threshold value. In this case, each pixel location in the first edge map marked as an edge pixel is automatically marked as an edge pixel in the second edge map at the corresponding location. In the case of a pixel location in the first edge map being marked as a flat pixel and at least one of the adjacent pixel locations being marked as an edge pixel, the corresponding high-frequency image 248 pixel value is compared to the second threshold value. If the pixel value in the high-frequency image 248 is equal to or greater than the second threshold value, the corresponding pixel value in the second edge map is marked as an edge pixel. If the pixel value in the high-frequency image 248 is less than the second threshold value, the corresponding pixel value in the second edge map is marked as a flat pixel. It will be clear to one skilled in the art that this process can be continued using additional thresholds.

Figure 5:
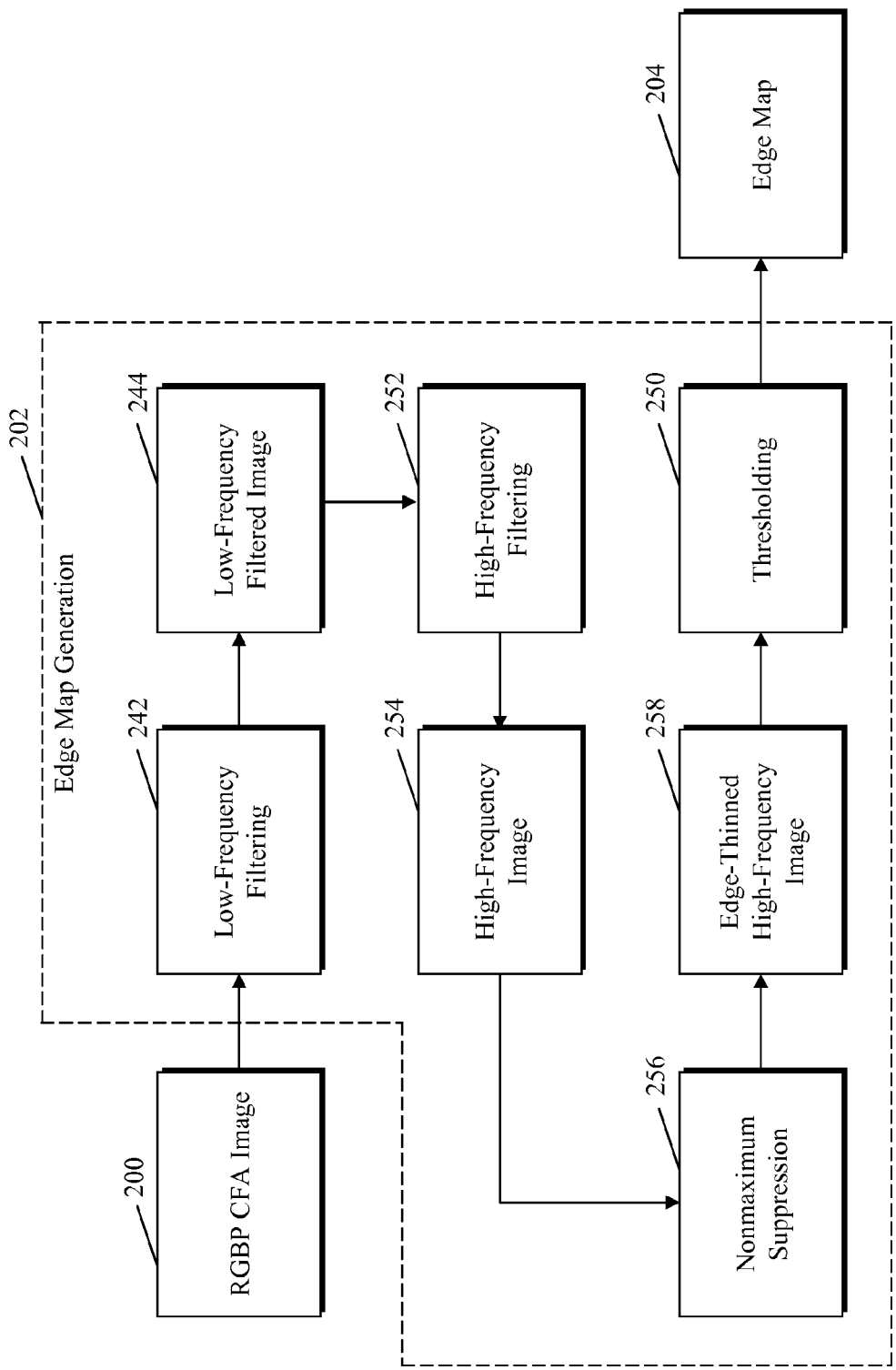
FIG. 5 is a block diagram showing an alternate embodiment of block 202 in FIG. 2 in more detail.

FIG. 5 is a detailed block diagram of the edge map generation block 202 (FIG. 2) for an alternate embodiment. A low-frequency filtering block 242 produces a low-frequency filtered image 244 from the RGBP CFA image 200 (FIG. 2). A high-frequency filtering block 252 produces a high-frequency image 254 from the low-frequency filtered image 244. A nonmaximum suppression block 256 produces an edge-thinned high-frequency image 258 from the high-frequency image 254. Finally, a thresholding block 250 produces the edge map 204 (FIG. 2) from the edge-thinned high-frequency image 258.

In FIG. 5, the low-frequency filtering block 242 is as described in FIG. 3. The high-frequency filtering block 252 produces a high-frequency image 254 from the panchromatic channel of the low-frequency filtered image 244. The high-frequency image 254 has three channels. The first channel contains the edge magnitude value which is the result produced by the same computations as performed by high-frequency filtering block 246 (FIG. 3). The second channel contains the horizontal gradient value produced by taking the absolute value of a convolution with a horizontal gradient kernel. An example of such a kernel is
(−1 0 1).
The third channel contains the vertical gradient value produced by taking the absolute value of a convolution with a vertical gradient kernel. An example of such a kernel is $$\begin{pmatrix} -1 \\ 0 \\ 1 \end{pmatrix}.$$

Figure 6:
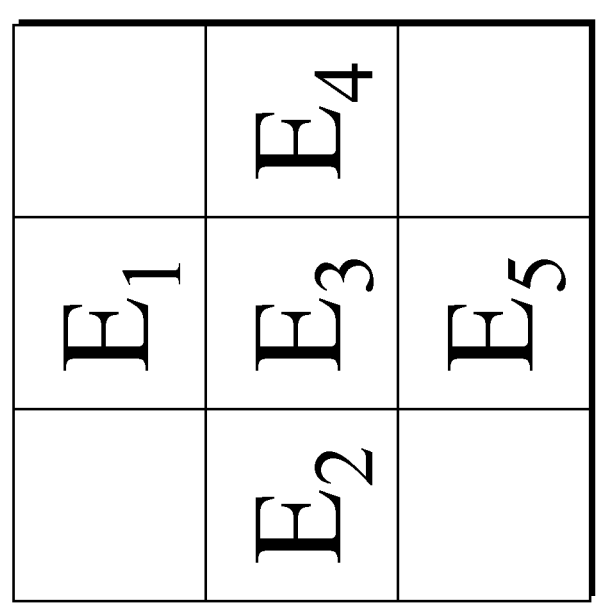

The nonmaximum suppression in block 256 is generally performed by comparing the horizontal gradient value to the vertical gradient value for each edge magnitude pixel location. If the horizontal gradient value is greater than or equal to the vertical gradient value then the direction of nonmaximum suppression is horizontal. If the vertical gradient value is greater than the horizontal value, the direction of the non-maximum suppression is vertical. FIG. 6 is an example pixel neighborhood of edge magnitude values with the edge magnitude value $E_3$ being operated on. If the direction of non-maximum suppression is horizontal, then if $E_3$ is greater than or equal to both $E_2$ and $E_4$, it is left unaltered. Otherwise, $E_3$ is set to zero. If the direction of nonmaximum suppression is vertical, then if $E_3$ is greater than or equal to both $E_1$ and $E_5$, it is left unaltered. Otherwise, $E_3$ is set to zero. In FIG. 5, the thresholding block 250 is the same operation as previously described under FIG. 3.

It will be evident to one skilled in the art that the edge map 204 (FIG. 2) can be enhanced in any number of ways, e.g., through the use of morphological processing, to reduce the effects of noise or to change the thickness of the features within the edge map 204 (FIG. 2) in accord with its subsequent use.

Returning to FIG. 2, several examples are now given for the full-color image enhancement block 212. One such full-color image enhancement is noise reduction. For each pixel in the full-color image 208, subsequently referred to as the central pixel, the corresponding value in the edge map 204 is checked to see if it is marked as either an edge pixel or a flat pixel. If the central pixel is an edge pixel, noise reduction of that pixel value can be skipped in order to preserve the edge detail. If the central pixel is a flat pixel, all of the other flat pixels within a given radius (distance) of the central pixel are averaged together to produce a noise-reduced central pixel value.

Another example of full-color image enhancement is sharpening (edge enhancement.) A sharpening channel can be produced from the full-color image 208 or from a reference panchromatic channel produced from the RGBP CFA image 200 as taught in U.S. patent application Ser. No. 11/621,139, filed Jan. 9, 2007. Next, for each pixel in the full-color image 208, subsequently referred to as the central pixel, the corresponding value in the edge map 204 is checked to see if it is marked as either an edge pixel or a flat pixel. If the central pixel is an edge pixel, the full corresponding sharpening channel value is added to the central pixel value to sharpen the edge detail. If the central pixel is a flat pixel, either a part or none of the corresponding sharpening channel value is added to the central pixel value to reduce the unwanted amplification of noise in the full-color image.

Another example of full-color image enhancement is color correction. Color correction is usually performed by multiplying the color channels value of the full-color image 208 by a 3×3 matrix into order to produce the enhanced full-color image 210. This computation takes the following form:

$$\begin{pmatrix} R' \\ G' \\ B' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix}$$

where (R,G,B) refer to the full-color image 208 color channels values and (R',G',B') refer to the enhanced full-color image 210. For each pixel in the full-color image 208 the corresponding value in the edge map 204 is checked to see if it is marked as either an edge pixel or a flat pixel. If the pixel is an edge pixel, the full corresponding color correction is applied to the full-color image 208 pixel value. If the pixel is a flat pixel, either a partial or no color correction is applied to the full-color image 208 pixel value to reduce the visibility of noise and image processing artifacts.

Figure 7:
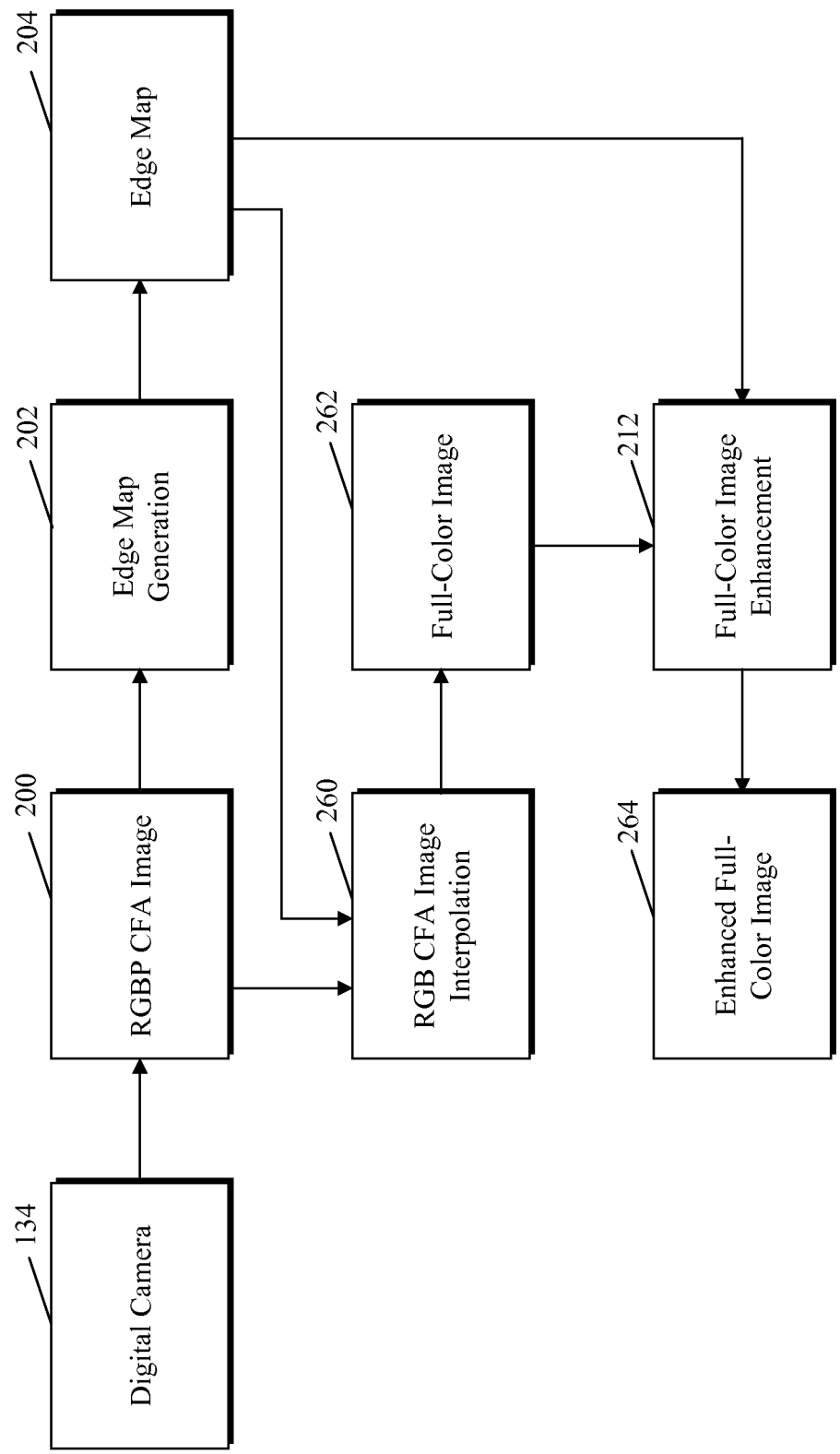
FIG. 7 is a block diagram of an alternate embodiment of the present invention.

FIG. 7 is a high-level diagram of an alternate embodiment of the present invention. The digital camera 134 (FIG. 1) is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. An edge map generation block 202 produces an edge map 204 from the RGBP CFA image 200. An RGB CFA image interpolation block 260 produces a full-color image 208 from the RGBP CFA image 200 and the edge map 204. A full-color image enhancement block 212 produces an enhanced full-color image 210 from the full-color image 208 and the edge map 204.

In FIG. 7, the RGB CFA image interpolation block 260 can be performed in any appropriate way known to those skilled in the art. As an example, a reference panchromatic channel can first be created from the RGBP CFA image 200 as taught in U.S. patent application Ser. No. 11/621,139, filed Jan. 9, 2007. This reference panchromatic channel provides a panchromatic value for every pixel in the RGBP CFA image 200. Referring now to FIG. 4, it is assumed that each pixel location has an associated panchromatic value, $P_N$, and edge map value, $E_N$, where N is the index of the pixel. To compute an estimate for $B_{61}$, begin by noting the edge map value $E_{61}$. Next, proceed consecutively from pixel $P_{61}$ in each of the eight compass directions (N, NE, E, SE, S, SW, W, and NW) out to a given maximum radius, checking the corresponding edge map values along the way. Once an edge map value that is different from $E_{61}$ is encountered or the maximum radius has been reached, processing is halted in that given compass direction. All values of $B_N$ encountered before the stop condition are used in the computation of $B_{61}$. In the case of a maximum radius of 5 and the Gaussian weighting below, if all encountered edge map values are the same as $E_{61}$, then $B_{61}$ is computed in the following manner:

$$B_{61} = P_{61} + \frac{\begin{array}{c}3920(B_{50} - P_{50}) + 560(B_{64} - P_{64}) + \\ 560(B_{94} - P_{94}) + 3920(B_{60} - P_{60})\end{array}}{3920 + 560 + 560 + 3920}$$

$$\begin{pmatrix} 1 & 8 & 28 & 56 & 70 & 56 & 28 & 8 & 1 \\ 8 & 64 & 224 & 448 & 560 & 448 & 224 & 64 & 8 \\ 28 & 224 & 784 & 1568 & 1960 & 1568 & 784 & 224 & 28 \\ 56 & 448 & 1568 & 3136 & 3920 & 3136 & 1568 & 448 & 56 \\ 70 & 560 & 1960 & 3920 & 4900 & 3920 & 1960 & 560 & 70 \\ 56 & 448 & 1568 & 3136 & 3920 & 3136 & 1568 & 448 & 56 \\ 28 & 224 & 784 & 1568 & 1960 & 1568 & 784 & 224 & 28 \\ 8 & 64 & 224 & 448 & 561 & 448 & 224 & 64 & 8 \\ 1 & 8 & 28 & 56 & 70 & 56 & 28 & 8 & 1 \end{pmatrix}$$

This computation would be reduced if one or more of the corresponding compass directions were terminated early. In the case that all compass directions are terminated before reaching any B pixels, then the early $E_N$ termination strategy is abandoned for the pixel at hand and all of the B pixels encountered are included in the computation. This approach is used for computing R, G, and B pixel values for all pixels in the RGBP CFA image 200. As a corollary to this example, the use of the panchromatic pixel values could be omitted and just the B pixel values used to produce:

$$B_{61} = \frac{3920 B_{50} + 560 B_{64} + 560 B_{94} + 3920 B_{60}}{3920 + 560 + 560 + 3920}$$

The details of the other blocks in FIG. 7 are the same as in the preferred embodiment, i.e., FIG. 2 et al.

Figure 8:
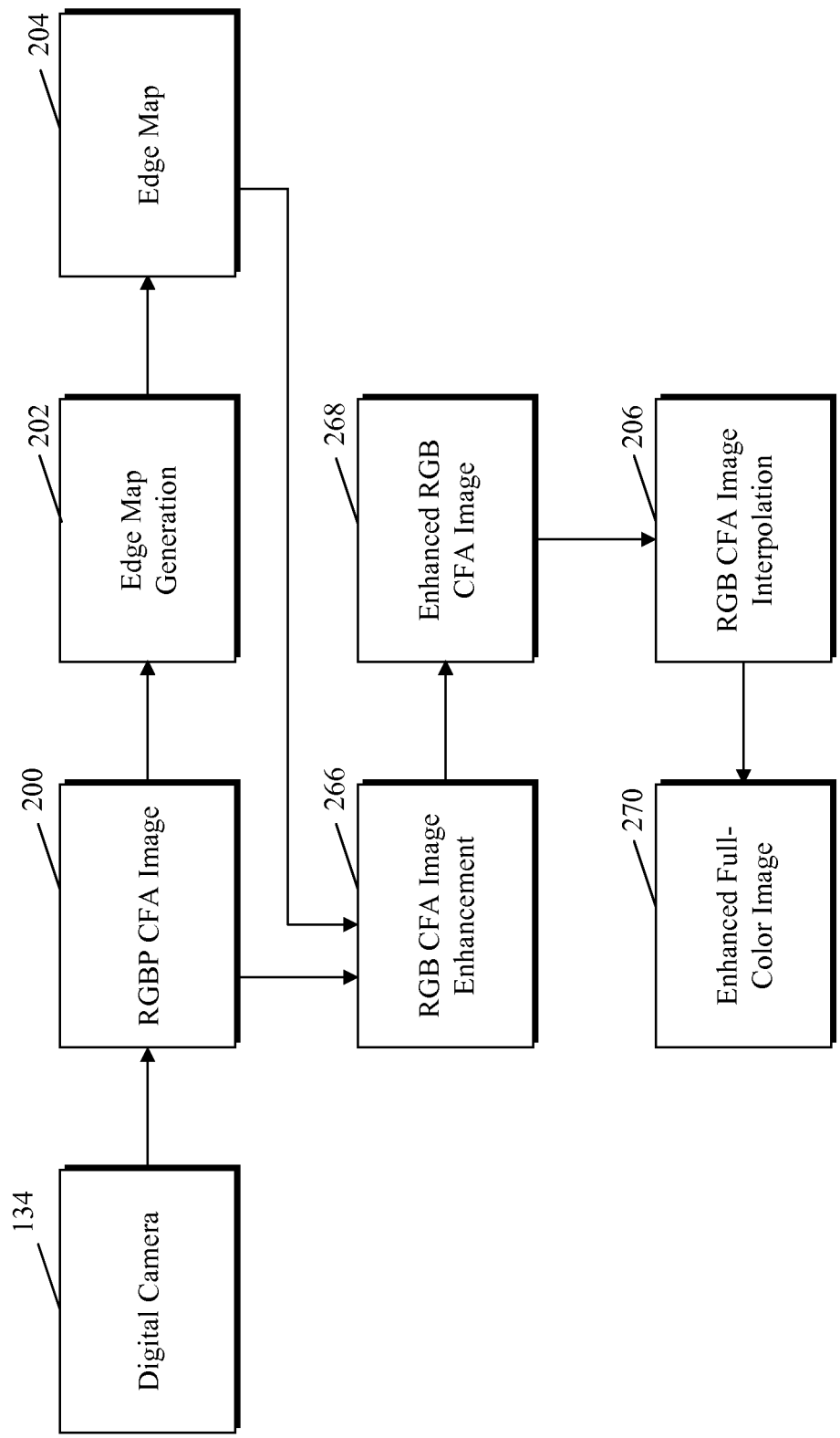
FIG. 8 is a block diagram of an alternate embodiment of the present invention.

FIG. 8 is a high-level diagram of an alternate embodiment of the present invention. The digital camera 134 (FIG. 1) is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. An edge map generation block 202 produces an edge map 204 from the RGBP CFA image 200. An RGB CFA image enhancement block 266 produces an enhanced RGB CFA image 268 from the RGBP CFA image 200 and the edge map 204. An RGB CFA image interpolation block 206 produces an enhanced full-color image 270 from the enhanced RGB CFA image 268.

In FIG. 8, the RGB CFA image enhancement block 266 can be performed in any appropriate way known to those skilled in the art. As an example, the RGB CFA image enhancement block 266 can perform noise reduction to produce a noise-reduced RGB CFA image as the enhanced RGB CFA image 268. For each pixel in the RGBP CFA image 200, subsequently referred to as the central pixel, the corresponding value in the edge map 204 is checked to see if it is marked as either an edge pixel or a flat pixel. If the central pixel is an edge pixel, noise reduction of that pixel value can be skipped in order to preserve the edge detail. If the central pixel is a flat pixel, all of the other flat pixels within a given radius (distance) of the central pixel are averaged together to produce a noise-reduced central pixel value.

The details of the other blocks in FIG. 8 are the same as in the preferred embodiment, i.e., FIG. 2 et al.

Figure 9:
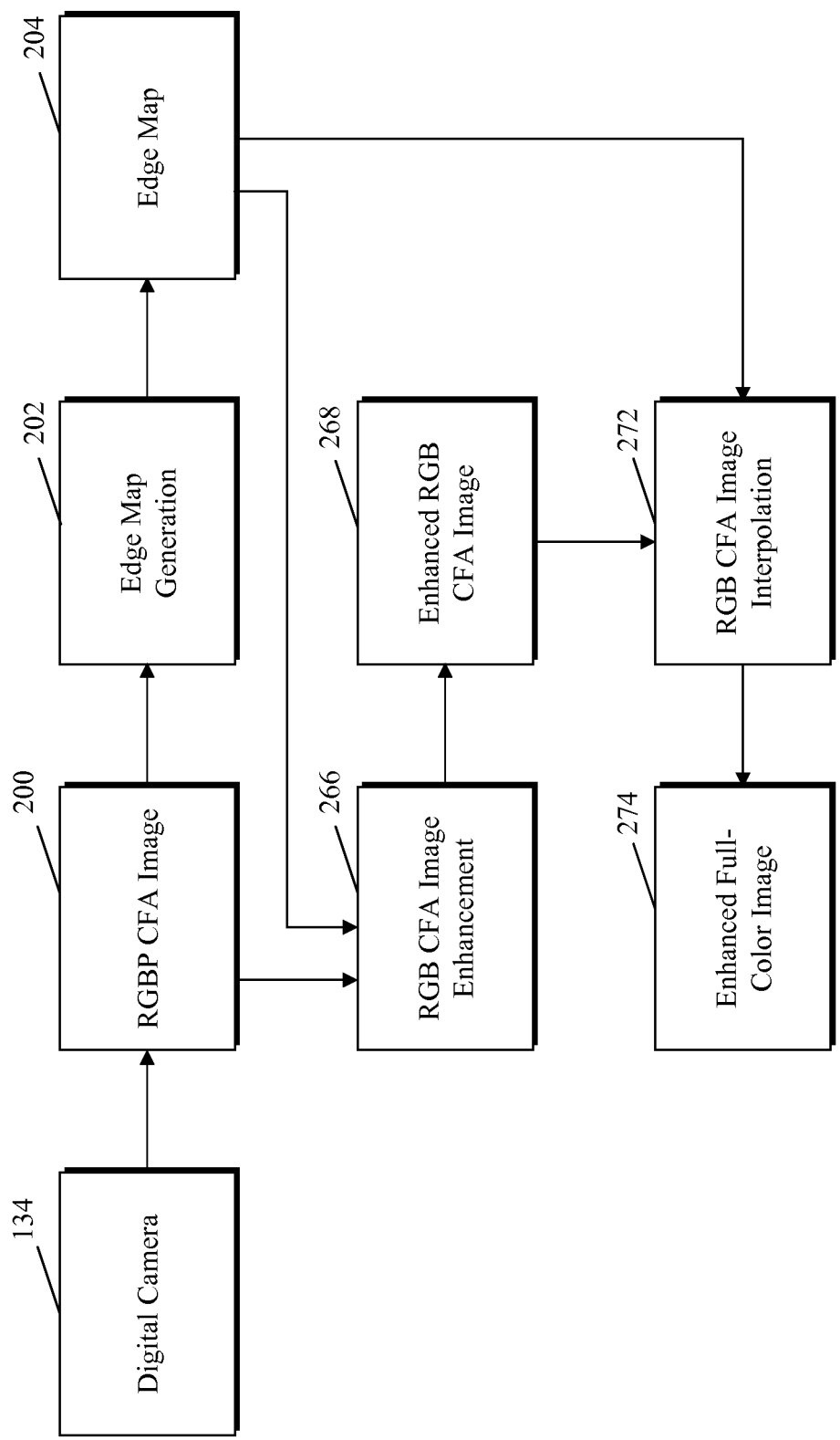
FIG. 9 is a block diagram of an alternate embodiment of the present invention.

FIG. 9 is a high-level diagram of an alternate embodiment of the present invention. The digital camera 134 (FIG. 1) is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. An edge map generation block 202 produces an edge map 204 from the RGBP CFA image 200. An RGB CFA image enhancement block 266 produces an enhanced RGB CFA image 268 from the RGBP CFA image 200 and the edge map 204. An RGB CFA image interpolation block 272 produces an enhanced full-color image 274 from the enhanced RGB CFA image 268 and the edge map 204.

In FIG. 9, the edge map generation block 202 is that same as described in FIG. 2. The RGB CFA image enhancement block 266 is the same as described in FIG. 8. The RGB CFA image interpolation block 272 is the same as the RGB CFA image interpolation block 260 as described in FIG. 7.

Figure 10:
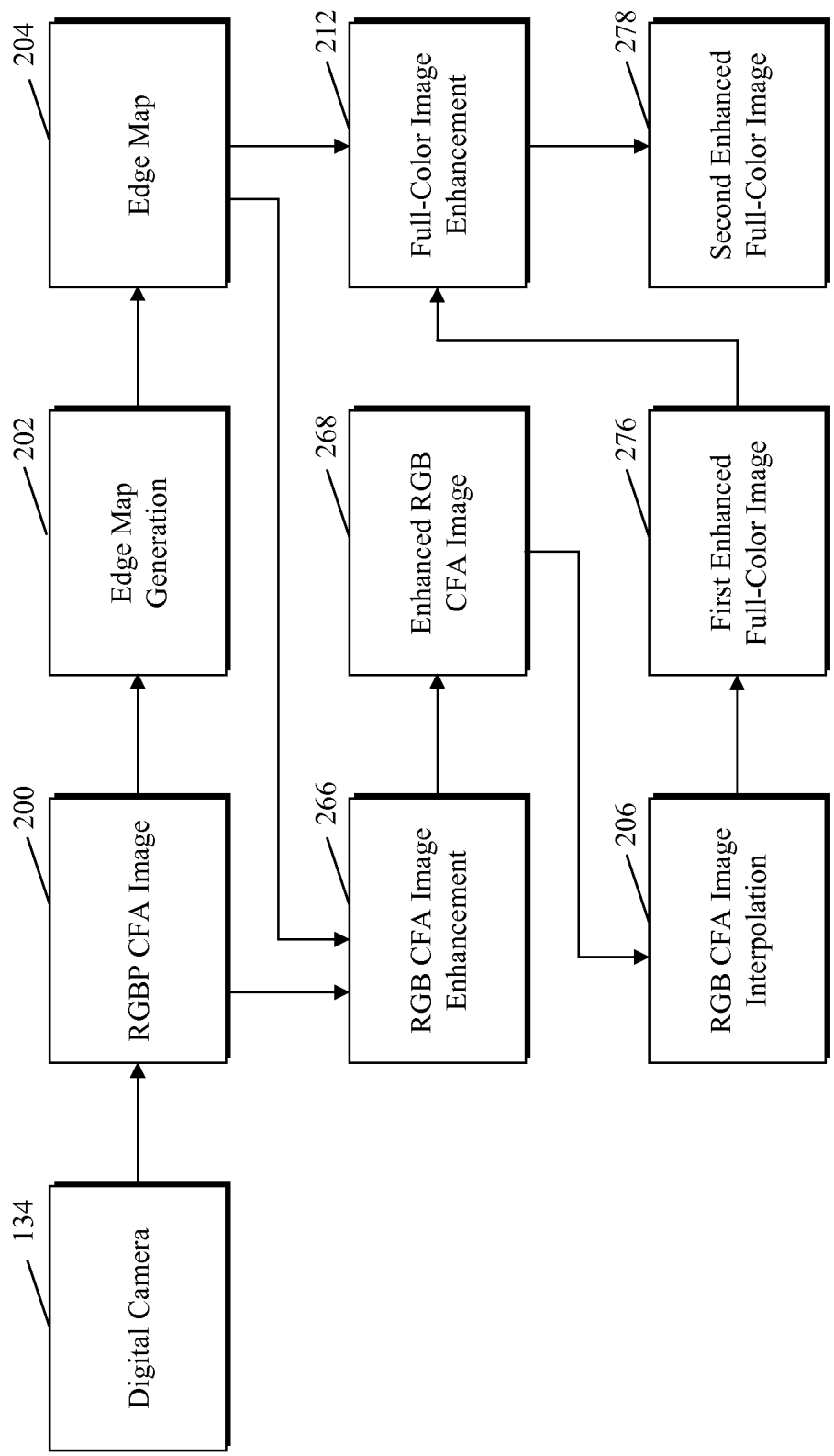
FIG. 10 is a block diagram of an alternate embodiment of the present invention.

FIG. 10 is a high-level diagram of an alternate embodiment of the present invention. The digital camera 134 (FIG. 1) is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. An edge map generation block 202 produces an edge map 204 from the RGBP CFA image 200. An RGB CFA image enhancement block 266 produces an enhanced RGB CFA image 268 from the RGBP CFA image 200 and the edge map 204. An RGB CFA image interpolation block 206 produces a first enhanced full-color image 276 from the enhanced RGB CFA image 268. The full-color image enhancement block 212 produces a second enhanced full-color image 278 from the first enhanced full-color image 276 and the edge map 204.

In FIG. 10, the edge map generation block 202 is that same as described in FIG. 2. The RGB CFA image enhancement block 266 is the same as described in FIG. 8. The RGB CFA image interpolation block 206 is the same as described in FIG. 2. The full-color image enhancement block 212 is the same as described in FIG. 2.

Figure 11:
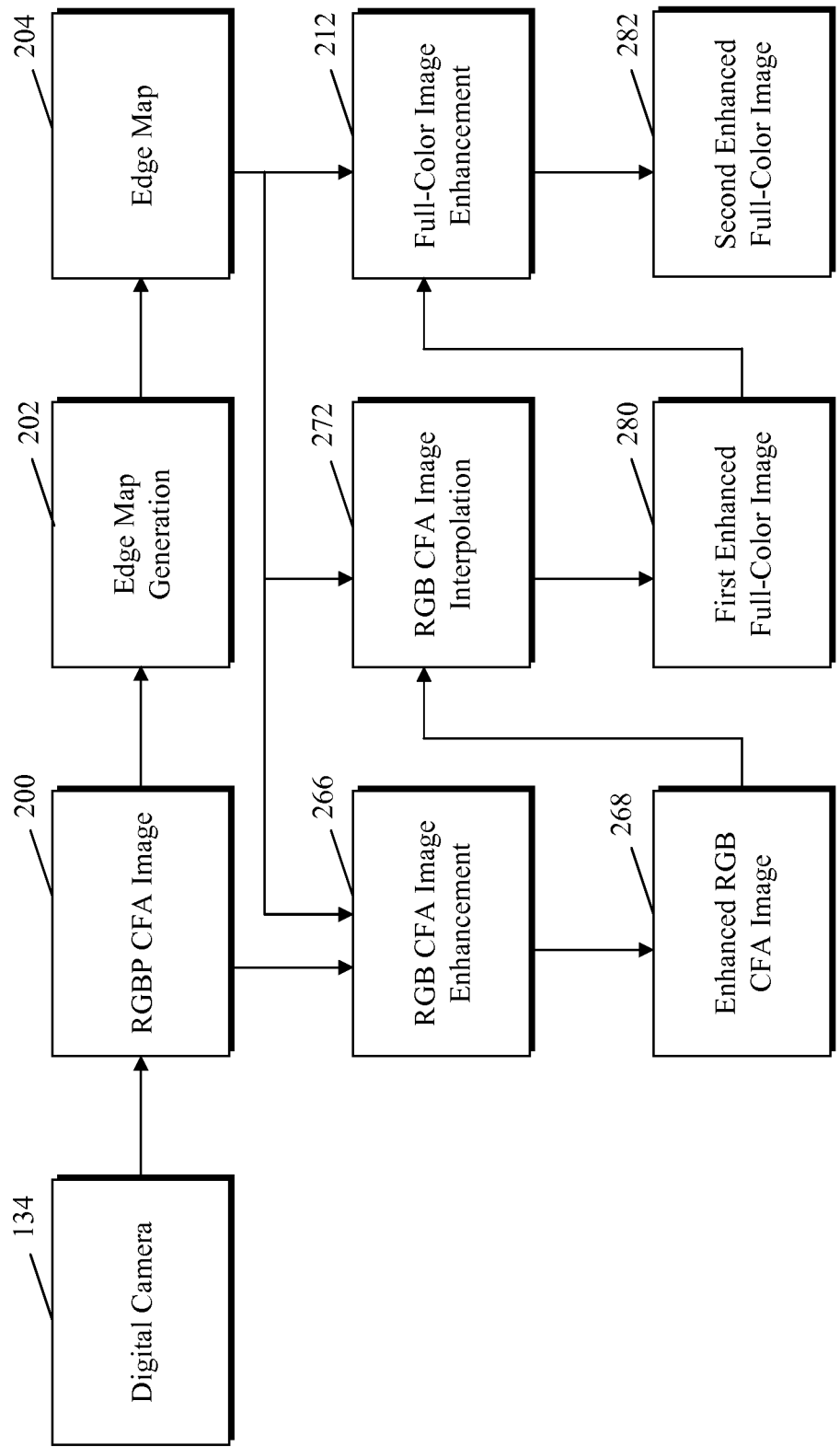
FIG. 11 is a block diagram of an alternate embodiment of the present invention.

FIG. 11 is a high-level diagram of an alternate embodiment of the present invention. The digital camera 134 (FIG. 1) is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. An edge map generation block 202 produces an edge map 204 from the RGBP CFA image 200. An RGB CFA image enhancement block 266 produces an enhanced RGB CFA image 268 from the RGBP CFA image 200 and the edge map 204. An RGB CFA image interpolation block 272 produces a first enhanced full-color image 280 from the enhanced RGB CFA image 268 and the edge map 204. The full-color image enhancement block 212 produces a second enhanced full-color image 282 from the first enhanced full-color image 280 and the edge map 204.

In FIG. 11, the edge map generation block 202 is that same as described in FIG. 2. The RGB CFA image enhancement block 266 is the same as described in FIG. 8. The RGB CFA image interpolation block 272 is the same as described in FIG. 9. The full-color image enhancement block 212 is the same as described in FIG. 2.

The edge map-based algorithms disclosed in the preferred embodiments of the present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

In each case, the edge map-based algorithms can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithms themselves can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithms can interface with a variety of workflow user interface schemes.

The edge map-based algorithms disclosed herein in accordance with the invention can have interior components that use various data detection and reduction techniques (e.g., face detection, eye detection, skin detection, flash detection).

The invention has been described in detail with particular reference to certain preferred embodiments thereof, but it will be understood that variations and modifications can be effected within the spirit and scope of the invention.

PARTS LIST

110 Computer System
112 Microprocessor-based Unit
114 Display
116 Keyboard
118 Mouse
120 Selector on Display
122 Disk Drive Unit
124 Compact Disk-read Only Memory (CD-ROM)
126 Floppy Disk
127 Network Connection
128 Printer
130 Personal Computer Card (PC card)
132 PC Card Reader
134 Digital Camera
136 Camera Docking Port
138 Cable Connection
140 Wireless Connection
200 RGBP CFA Image
202 Edge Map Generation
204 Edge Map
206 RGB CFA Image Interpolation
208 Full-Color Image
210 Enhanced Full-Color Image
212 Full-Color Image Enhancement
242 Low-Frequency Filtering
244 Low-Frequency Filtered Image
246 High-Frequency Filtering
248 High-Frequency Image
250 Thresholding 252 High-Frequency Filtering
254 High-Frequency Image
256 Nonmaximum Suppression
258 Edge-Thinned High-Frequency Image
260 RGB CFA Image Interpolation
266 RGB CFA Image Enhancement
268 Enhanced RGB CFA Image
270 Enhanced Full-Color Image
272 RGB CFA Image Interpolation
274 Enhanced Full-Color Image
276 First Enhanced Full-Color Image
278 Second Enhanced Full-Color Image
280 First Enhanced Full-Color Image
282 Second Enhanced Full-Color Image

The invention claimed is:

1. A method of providing an enhanced full-color image of a scene, comprising: using a processor (or computer) to perform the steps of:
   a. using a captured image of the scene that was captured by a two-dimensional sensor array having both color pixels corresponding to at least three color photoresponses and panchromatic pixels;
   b. forming a high frequency image from the captured image and thresholding the high frequency pixel values in the high frequency image;
   c. forming an edge map in response to the panchromatic pixels in the thresholded high frequency image;
   d. forming the full-color image in response to the captured color pixels; and
   e. using the edge map to enhance the full-color image.

2. The method according to claim 1 wherein step c includes using both the captured color pixels and the captured panchromatic pixels to form the edge map.

3. The method according to claim 1 further using the edge map to form the full color image.

4. The method according to claim 1 wherein the edge map is used to provide noise cleaning.

5. The method according to claim 1 wherein the edge map is used to provide sharpening.

6. The method according to claim 1 wherein the edge map is used to provide color correction.

7. The method according to claim 1 further including modifying the captured color pixels or panchromatic pixels or both prior to forming the full-color image.

8. The method according to claim 1 wherein modifying the captured color pixels includes noise cleaning the captured colored pixels prior to forming the full-color image.

* * * * *